DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 8

T911,008
NITROGEN SOLUTIONS AND SUSPENSIONS
John G. Getsinger, 420 Eason, Florence, Ala. 35660
Filed July 31, 1972, Ser. No. 276,591
**Int. Cl. C05c *9/00***
U.S. Cl. 71—30
1 Sheet Drawing. 10 Pages Specification

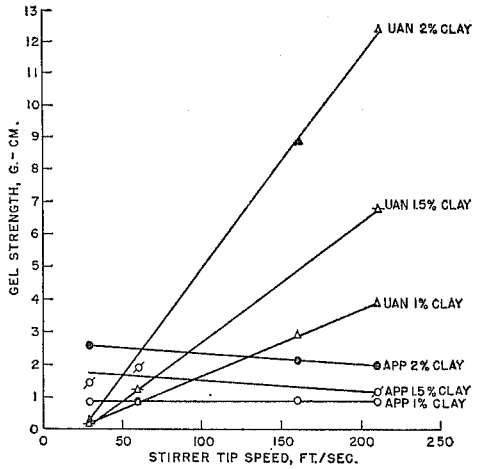

COMPARISON OF EFFECTS OF SHEAR-TYPE STIRRING FOR 16 MINUTES AND CLAY CONTENT ON GEL STRENGTHS DEVELOPED IN UREA-AMMONIUM NITRATE (32% N) AND AMMONIUM POLYPHOSPHATE (11% N AND 37% $P_2O_5$)

The process produces improved fluid nitrogen fertilizers by addition of a gelling-type clay and utilizing high-shear agitation for dispersion of the clay. Clay is dispersed in nitrogen solutions, such as urea-ammonium nitrate solution, with a high-shear agitator or centrifugal pump. A high degree of shear is necessary for dispersing clay in nitrogen solutions; shear may be provided by high speed of agitator blades or impeller blades in a pump. Shear may be the result of cutting action of blades through the fluid or close clearance of two parts of a shearing-type agitator or pump. Products with clay well dispersed, as measured by a gelometer, have improved storage characteristics at low temperatures, may be used for direct application, and give improved suspensions when mixed with fluids containing phosphate and potassium. In addition to the improvements in quality, the clay in the nitrogen solution eliminates the necessity of adding extra clay to the NPK fertilizers at the time of fertilizer mixing. Simple blending equipment and operation for mixing fluids can be used at the fertilizer mixing site, as compared with the use of more expensive equipment and operation for gelling the clay.

NITROGEN SOLUTIONS AND SUSPENSIONS
Filed July 31, 1972
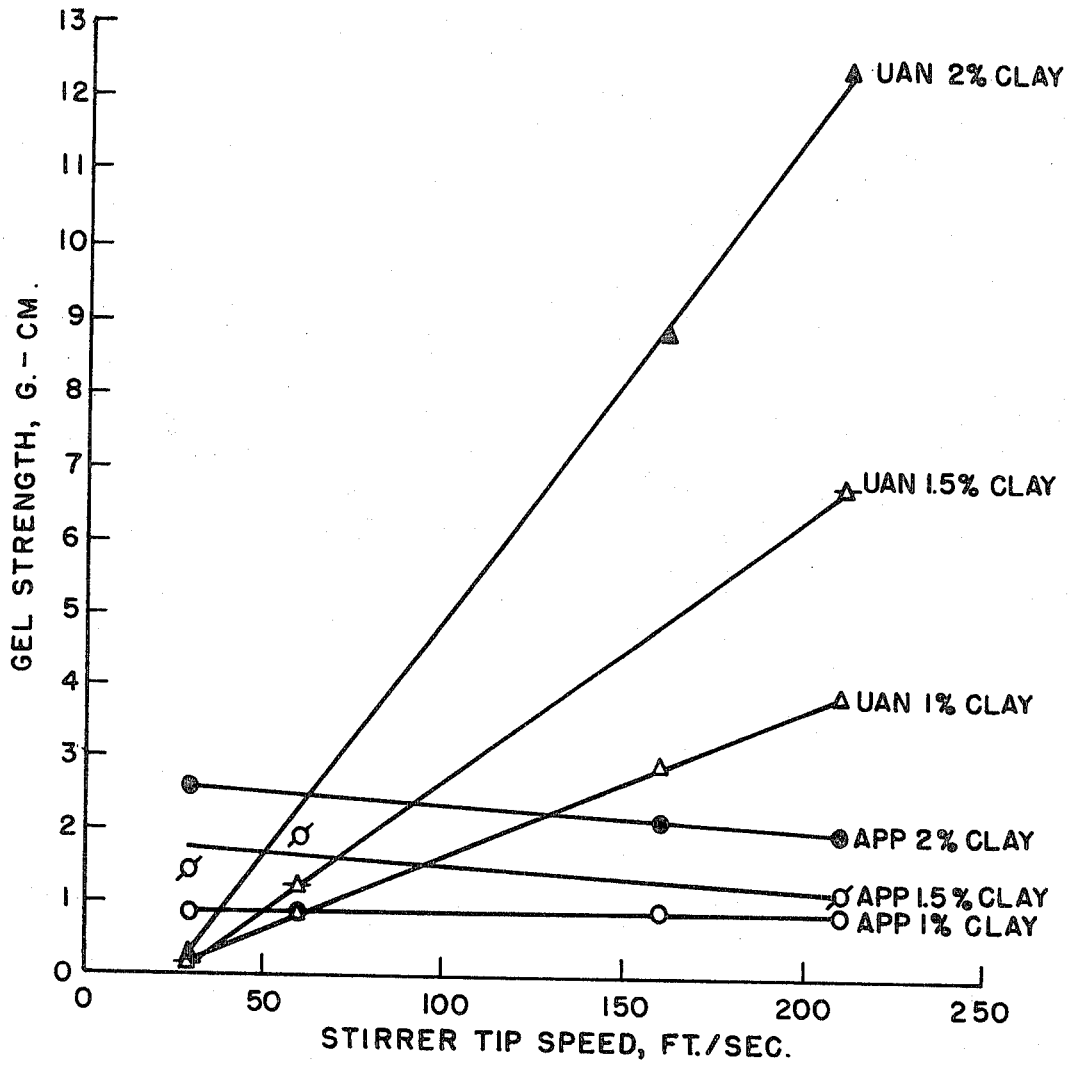
COMPARISON OF EFFECTS OF SHEAR-TYPE STIRRING FOR 16 MINUTES AND CLAY CONTENT ON GEL STRENGTHS DEVELOPED IN UREA-AMMONIUM NITRATE (32% N) AND AMMONIUM POLYPHOSPHATE (11% N AND 37% $P_2O_5$)